(12) United States Patent
Wang et al.

(10) Patent No.: US 11,516,046 B2
(45) Date of Patent: Nov. 29, 2022

(54) CONTROLLER AREA NETWORK FAULT DETECTION AND RECOVERY

(71) Applicant: GM GLOBAL TECHNOLOGY OPERATIONS LLC, Detroit, MI (US)

(72) Inventors: Shige Wang, Northville, MI (US); Chang Liu, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 299 days.

(21) Appl. No.: 16/741,780

(22) Filed: Jan. 14, 2020

(65) Prior Publication Data

US 2021/0218596 A1    Jul. 15, 2021

(51) Int. Cl.
*H04L 12/40* (2006.01)
*G07C 5/08* (2006.01)
*G07C 5/00* (2006.01)

(52) U.S. Cl.
CPC ........ *H04L 12/40176* (2013.01); *G07C 5/008* (2013.01); *G07C 5/0808* (2013.01); *G07C 5/0816* (2013.01); *H04L 12/40013* (2013.01); *H04L 2012/40215* (2013.01); *H04L 2012/40273* (2013.01)

(58) Field of Classification Search
CPC ......... H04L 12/40176; H04L 12/40013; H04L 2012/40215; H04L 2012/40273; H04L 41/0654; G07C 5/008; G07C 5/0808; G07C 5/0816
See application file for complete search history.

(56) References Cited

U.S. PATENT DOCUMENTS

| 8,930,769 | B2 | 1/2015 | Marinelli et al. |
| 9,110,951 | B2 | 8/2015 | Jiang |
| 2019/0228322 | A1* | 7/2019 | Wenner ............ G07C 5/0816 |

FOREIGN PATENT DOCUMENTS

| CN | 108241355 A | 7/2018 |
| CN | 108737187 A | 11/2018 |

OTHER PUBLICATIONS

Chinese Office Action for CN Application No. 202110011338.7; dated Sep. 23, 2022 (pp. 1-6).

* cited by examiner

*Primary Examiner* — Michael V Kerrigan
(74) *Attorney, Agent, or Firm* — Cantor Colburn LLP (57) ABSTRACT

A controller area network fault detection and recovery system and method may include a fault detection module, a fault remediation module, a checkpoint manager, and a recovery manager configured to select one or more of the fault remediation mechanisms based upon detected CAN faults. Remediation of detected CAN faults is controlled at a CAN driver software level in accordance with selected fault remediation mechanisms in a predetermined ordered hierarchy.

20 Claims, 5 Drawing Sheets

CONTROLLER AREA NETWORK FAULT DETECTION AND RECOVERY

INTRODUCTION

This disclosure is related to communications in controller area networks.

Vehicle systems include a plurality of subsystems, including by way of example, engine, transmission, ride/handling, braking, HVAC, and occupant protection. Multiple controllers may be employed to monitor and control operation of the subsystems. The controllers may be configured to communicate via a controller area network (CAN) to coordinate operation of the vehicle in response to operator commands, vehicle operating states, and external conditions.

CAN systems may employ a bus topology for the communication connection among all the controllers that may include a linear topology, a star topology, or a combination of star and linear topologies. High-speed CAN systems may employ linear topology, whereas low-speed CAN systems may employ a combination of star and linear topologies. CAN systems may employ separate power and ground topologies for the power and ground lines to all the controllers. Controllers may communicate with each other through messages that are sent at different periods on the CAN bus. CAN system messages do not contain defined addresses, only defined messages. As such, all messages may be received and processed by all network controllers.

CAN systems may have rudimentary fault detection and recovery primarily directed toward aborting transmission upon detection and preventing acceptance of aborted messages. Error detection may be done at the bit level and at the message level. Persistent errors may result in a controller taking itself offline to prevent bus tie up. Such detection systems generally are unable to identify a root cause of a fault and are unable to distinguish transient and intermittent faults. CAN systems continue to grow in complexity, including the number of nodes being serviced on a network. Moreover, CAN systems may adopt network ID protocols leading to increased messaging density as single physical controllers may exhibit multiple node messaging capabilities. As network messaging density increases, the likelihood of runtime related faults may also increase.

SUMMARY

In one exemplary embodiment, a controller area network (CAN) fault detection and recovery system includes a CAN node comprising a controller including a microcontroller, a CAN controller and a transceiver for transmitting and receiving CAN message frames. The controller includes a fault detection module having a plurality of fault detection mechanisms for detecting CAN faults, a fault remediation module having a plurality of fault remediation mechanisms for remediating detected CAN faults, and a recovery manager configured to select one or more of the fault remediation mechanisms based upon detected CAN faults, and to control remediation of detected CAN faults in accordance with the selected fault remediation mechanisms in a predetermined ordered hierarchy.

In addition to one or more of the features described herein, the controller may include a checkpoint manager for maintains a running store of CAN message frames.

In addition to one or more of the features described herein, the fault detection module, the fault remediation module and the recovery manager may include a basic software level.

In addition to one or more of the features described herein, the remediation of detected CAN faults may be carried out at a CAN driver software level.

In addition to one or more of the features described herein, the plurality of fault remediation mechanisms includes a buffer clean-up and software flag reset, a CAN controller reset, and a microcontroller running reset.

In addition to one or more of the features described herein, the predetermined ordered hierarchy includes, in order, the buffer clean-up and software flag reset, the CAN controller reset, and the microcontroller running reset.

In addition to one or more of the features described herein, the plurality of fault detection mechanisms for detecting CAN faults includes a transmit lockup detector, a receive lockup detector, and a bus-off fault detector.

In addition to one or more of the features described herein, the transmit lockup detector includes a CAN driver software level diagnostic and a physical layer diagnostic.

In addition to one or more of the features described herein, the receive lockup detector includes a predetermined period wherein no CAN message is received or a full receive buffer.

In addition to one or more of the features described herein, the receive lockup detector includes, subsequent to the predetermined period wherein no CAN message is received, invocation of a remote check.

In addition to one or more of the features described herein, the predetermined ordered hierarchy includes least to most intrusive fault remediation mechanisms.

In another exemplary embodiment, a method for controller area network (CAN) fault detection and recovery includes detecting CAN faults with a fault detection module including a plurality of fault detection mechanisms, selecting fault remediation mechanisms from a fault remediation module with a recovery manager based upon detected CAN faults, and controlling remediation of detected CAN faults in accordance with the selected fault remediation mechanisms in a predetermined ordered hierarchy.

In addition to one or more of the features described herein, the fault remediation mechanisms include a buffer clean-up and software flag reset, a CAN controller reset, and a microcontroller running reset.

In addition to one or more of the features described herein, the predetermined ordered hierarchy includes, in order, the buffer clean-up and software flag reset, the CAN controller reset, and the microcontroller running reset.

In addition to one or more of the features described herein, the plurality of fault detection mechanisms includes transmit lockup detection, receive lockup detection, and a bus-off fault detection.

In addition to one or more of the features described herein, the transmit lockup detection includes a CAN driver software level diagnosis and a physical layer diagnosis.

In addition to one or more of the features described herein, the receive lockup detection includes a predetermined period wherein no CAN message is received or a full receive buffer.

In addition to one or more of the features described herein, the receive lockup detection includes, subsequent to the predetermined period wherein no CAN message is received, invoking a remote check.

In addition to one or more of the features described herein, the predetermined ordered hierarchy includes least to most intrusive fault remediation mechanisms.

In yet another exemplary embodiment, a controller area network (CAN) fault detection and recovery system includes a CAN node having a controller with a microcontroller, a CAN controller and a transceiver for transmitting and receiving CAN message frames. The controller includes a fault detection module having a plurality of fault detection mechanisms for detecting CAN faults, the fault detection mechanisms having a transmit lockup detector, a receive lockup detector, and a bus-off fault detector, a fault remediation module including a plurality of fault remediation mechanisms for remediating detected CAN faults, the fault remediation mechanisms having a buffer clean-up and software flag reset, a CAN controller reset, and a microcontroller running reset, a checkpoint manager for maintains a running store of CAN message frames, and a recovery manager configured to select one or more of the fault remediation mechanisms based upon detected CAN faults, and to control remediation of detected CAN faults at a CAN driver software level in accordance with the selected fault remediation mechanisms in a predetermined ordered hierarchy.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

The following description is merely exemplary in nature and is not intended to limit the present disclosure, its application or uses. Throughout the drawings, corresponding reference numerals indicate like or corresponding parts and features. As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle controller area networks and in-plant and service-related networks. Functions of the control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

Figure 1:
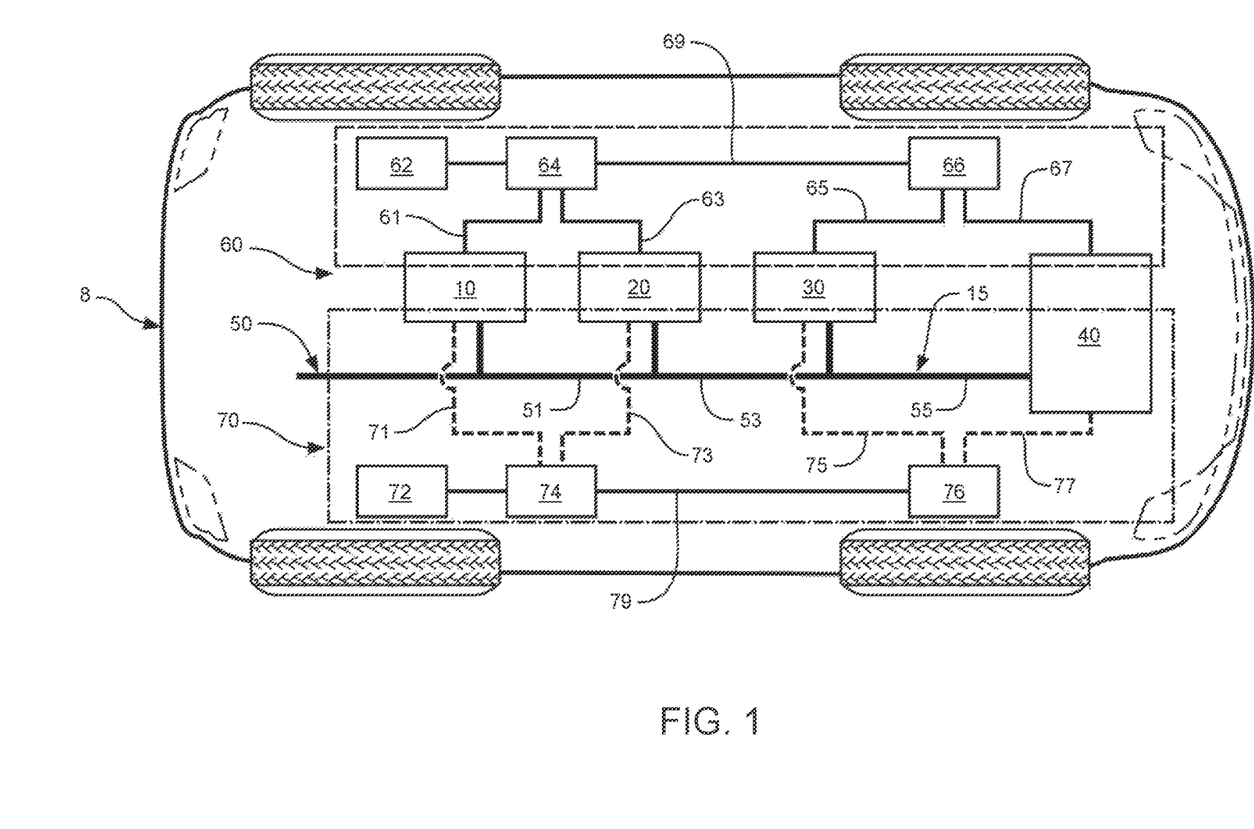
FIG. 1 illustrates a vehicle including a controller area network (CAN) including a CAN bus and a plurality of nodes, e.g., controllers, in accordance with the present disclosure.

Referring now to the drawings, which are for the purpose of illustrating certain exemplary embodiments only and not for the purpose of limiting the same, FIG. 1 schematically illustrates a vehicle 8 including a controller area network (CAN) 50 including a CAN bus 15 and a plurality of nodes (i.e., controllers 10, 20, 30 and 40). The term "node" refers to any active electronic device that signally connects to the CAN bus 15 and is capable of sending, receiving, or forwarding information over the CAN bus 15. Each of the controllers 10, 20, 30 and 40 signally connects to the CAN bus 15 and electrically connects to a power grid 60 and a ground grid 70. Each of the controllers 10, 20, 30 and 40 includes an electronic controller or other on-vehicle device that is configured to monitor or control operation of a subsystem of the vehicle 8 and communicate via the CAN bus 15. The illustrated embodiment of the CAN 50 is a non-limiting example of a CAN, which may be employed in any of a plurality of system configurations.

The CAN bus 15 includes a plurality of communications links, including a first communications link 51 between controllers 10 and 20, a second communications link 53 between controllers 20 and 30, and a third communications link 55 between controllers 30 and 40. The power grid 60 includes a power supply 62 (e.g., a battery that electrically connects to a first power bus 64 and a second power bus 66 to provide electric power to the controllers 10, 20, 30 and 40 via power links). As shown, the power supply 62 connects to the first power bus 64 and the second power bus 66 via power links that are arranged in a series configuration, with power link 69 connecting the first and second power buses 64 and 66. The first power bus 64 connects to the controllers 10 and 20 via power links that are arranged in a star configuration, with power link 61 connecting the first power bus 64 and the controller 10 and power link 63 connecting the first power bus 64 to the controller 20. The second power bus 66 connects to the controllers 30 and 40 via power links that are arranged in a star configuration, with power link 65 connecting the second power bus 66 and the controller 30 and power link 67 connecting the second power bus 66 to the controller 40. The ground grid 70 includes a vehicle ground 72 that connects to a first ground bus 74 and a second ground bus 76 to provide electric ground to the controllers 10, 20, 30 and 40 via ground links. As shown, the vehicle ground 72 connects to the first ground bus 74 and the second ground bus 76 via ground links that are arranged in a series configuration, with ground link 79 connecting the first and second ground buses 74 and 76. The first ground bus 74 connects to the controllers 10 and 20 via ground links that are arranged in a star configuration, with ground link 71 connecting the first ground bus 74 and the controller 10 and ground link 73 connecting the first ground bus 74 to the controller 20. The second ground bus 76 connects to the controllers 30 and 40 via ground links that are arranged in a star configuration, with ground link 75 connecting the second ground bus 76 and the controller 30 and ground link 77 connecting the second ground bus 76 to the controller 40. Other topologies for distribution of communications, power, and ground for the controllers 10, 20, 30 and 40 and the CAN bus 15 may be employed with similar effect.

Each of the controllers 10, 20, 30 and 40 transmits and receives messages across the CAN 50 via the CAN bus 15, with message transmission rates occurring at different periods for different ones of the controllers. A CAN message frame has a predetermined format that includes, in one embodiment, a start of frame (SOF), an identifier (11-bit identifier), a single remote transmission request (RTR), a dominant single identifier extension (IDE), a reserve bit (r0), a 4-bit data length code (DLC), up to 64 bits of data (DATA), a 16-bit cyclic redundancy check (CDC), 2-bit acknowledgement (ACK), a 7-bit end-of-frame (EOF) and a 3-bit interframe space (IFS). A CAN message may be corrupted, with known errors including stuff errors, form errors, ACK errors, bit 1 errors, bit 0 errors, and CRC errors. The errors are used to generate an error warning status including one of an error-active status, an error-passive status, and a bus-off error status. The error-active status, error-passive status, and bus-off error status are assigned based upon increasing quantity of detected bus error frames, i.e., an increasing bus error count.

Figure 2:
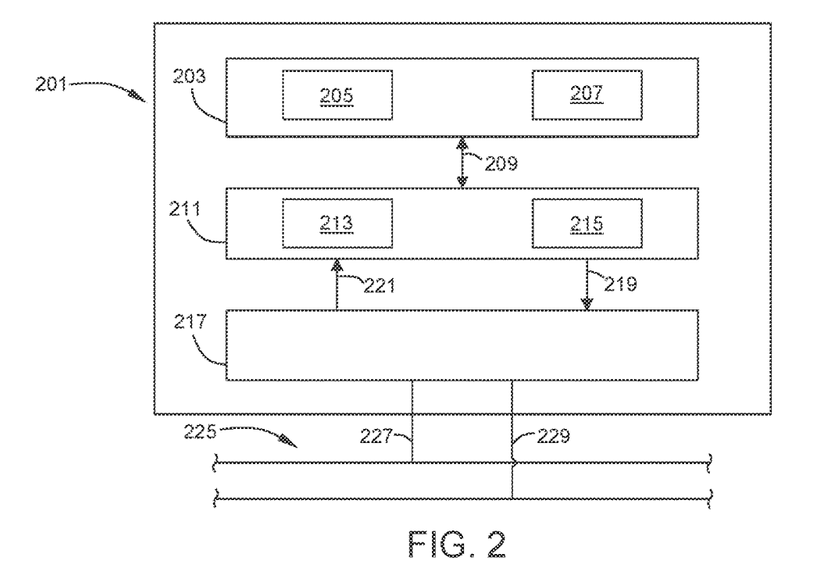
FIG. 2 illustrates a controller, in accordance with the present disclosure.

With further reference to FIG. 2, a block diagram of a controller 201 is illustrated. Controller 201 may include a microcontroller 203 including respective receive and transmit message buffers 205, 207. Microcontroller 203 may be in signal communication 209 with CAN controller 211. CAN controller 211 may include respective receive and transmit message buffers 213, 215. Transceiver 217 is signally connected and controlled by CAN controller 211 at transmit line 219 and receive line 221. Transceiver 217 may physically interface with the CAN bus 225 via CAN high and CAN low lines 227, 229. Can controller 211 may be implemented as a standalone controller, as a chip peripheral to the microcontroller 203, or may be up-integrated into the microcontroller software levels. Similarly, the transceiver 217 may be implemented as standalone hardware, as a chip peripheral to the microcontroller 203, or as part of a single chip integration with the CAN controller or the microcontroller and the CAN controller.

Various hardware and software issues and anomalies may contribute to error counts and error status of the controllers, ultimately leading to a bus-off error status. A common practice dictates controller reset when a bus-off error status is active. Controller resets are extremely intrusive and completely shut down runtime operations and controls dependent upon the controller and may affect other controller operations in distributed systems. However, not all hardware and software issues and anomalies will lead to a bus-off error, and not all hardware and software issues and anomalies resulting in bus-off errors require a controller reset. Runtime faults caused by system dynamics, for example, excessive message volume or excessively long silence, may result in unnecessary controller resetting or incompletely addressing faults at an appropriate level. Other runtime faults may not even be detected with current practices. Transceiver lockups may occur due to noise or transients, for example, which faults may correspond to a physical layer anomaly but may not relate to bus hardware shorts or opens. The CAN controller may be operationally stable and effective to control transmit and receive messages in the respective message buffers, yet buffer overflows and/or lockups may occur resulting in lost transmissions and receptions of messages. The CAN controller may incur a software anomaly wherein the transmission and/or reception of messages is compromised or halted. Thus, it is desirable to improve detection and recovery capabilities in a CAN environment.

Figure 3:
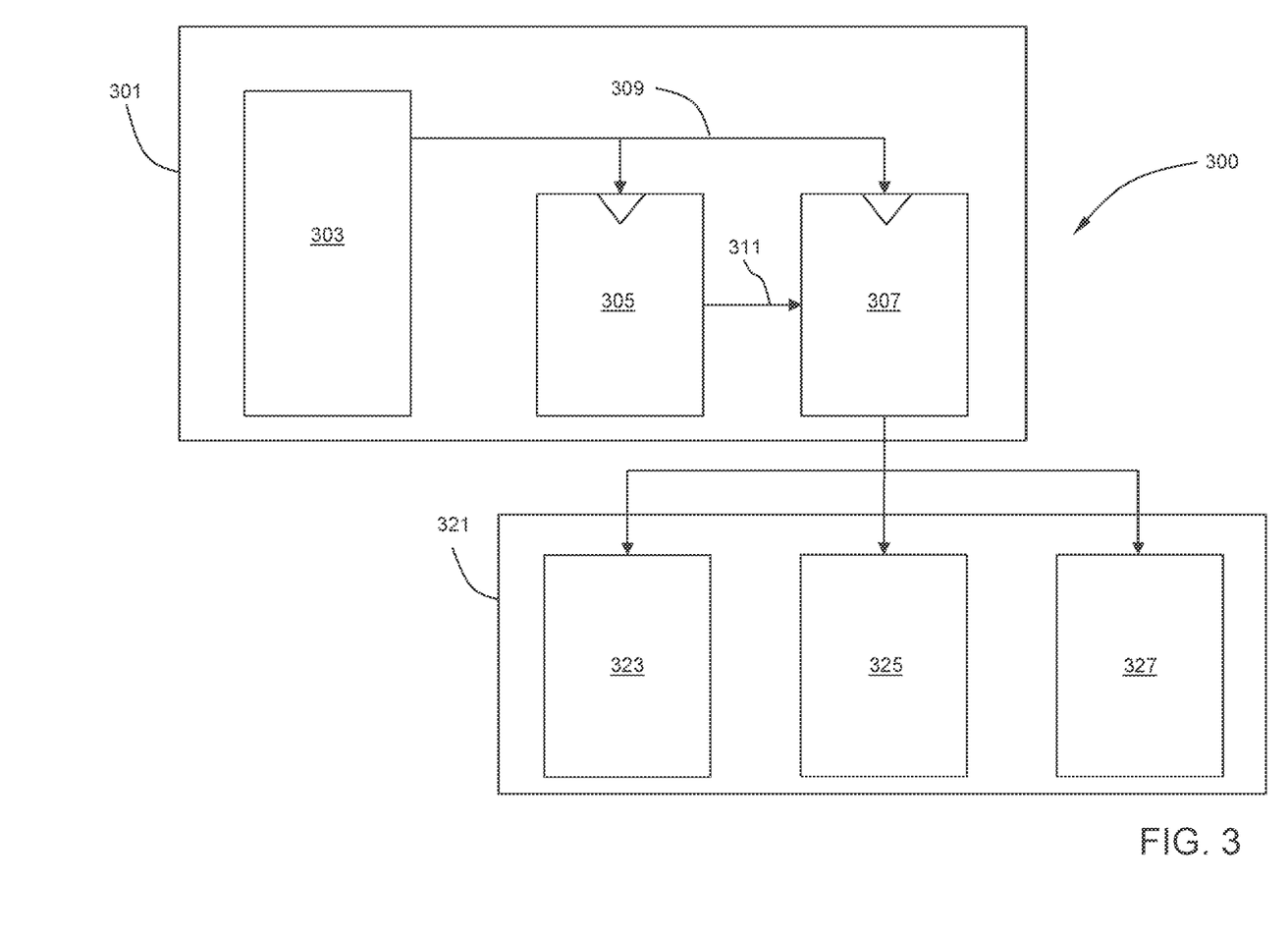
FIG. 3 illustrates a control strategy and method including a basic level and a CAN driver level, in accordance with the present disclosure.

In accordance with the present disclosure and with further reference to FIG. 3, a control strategy and method 300 may be implemented by controller 201. A basic software level 301 may include runtime operating system 303 including applications, processes and services implemented by microcontroller 203, for example, control and diagnostics associated with the system or systems for which the controller 201 is tasked to monitor and control, alone or in combination with other controllers in dedicated or distributed fashion. As relates to CAN system operations, runtime operating system 303 may include higher-level protocols including, for example, protocols for accommodating data needs in excess of standard CAN message frames (i.e. data segmentation and reassembly) and for network management (e.g. use of node IDs). Moreover, and particularly related to the present disclosure, the runtime operating system 303 may include applications, processes and services related to lower-level CAN messaging and participation of controller 201 as a controller node on CAN 50 as set forth herein with respect to FIG. 1. As such, runtime operating system 303 may be involved in the provision of CAN message frames for queuing and transmission by the CAN controller 211 and transceiver 217. Likewise, runtime operating system 303 may be involved in the processing of CAN message frames received by the CAN controller 211 and the transceiver 217. In accordance with one embodiment of the present disclosure, the basic software level 301 may further include lockup detector(s) 305 and a recovery manager 307 as described further herein. Basic software level 301 may additionally include other support applications, processes and services such as a checkpoint manager (not illustrated) as described further herein. Lockup detector(s) 305 may be primarily tasked with monitoring and diagnostic functions related to a variety of transmit and receive faults associated with hardware and software of the CAN controller 211 and transceiver 217 as described further herein. Likewise, recovery manager 307 may be primarily tasked with remediation functions particularly suited to detected faults in an ordered, hierarchical approach to recovery as described further herein as a function, at least in part, of diagnostic determinations 311 made in accordance with the lockup detector(s) 305. As can be appreciated from FIG. 3, runtime operating system 303 may provide task control 309 of lockup detector(s) 305 and recovery manager 307 such as by periodic calls or event triggers. A CAN driver software level 321 also may be implemented within controller 201. Recovery manager 307 interfaces with CAN driver software level 321 to control and implement various remedial actions, and combinations thereof, to be taken as appropriate at the hardware and software levels of the CAN controller 211, transceiver 217, and microcontroller 203 of controller 201 as described further herein. Remedial actions in accordance with the present disclosure may include CAN buffer and flag reset process 323, CAN controller reset process 325, and microcontroller reset process 327. The control strategy and method 300 may further include additional software levels (not illustrated) such as, for example, a data level for managing referential data including static and adaptive tables and data structures, and a user interface level including for service and maintenance functions.

Figure 4:
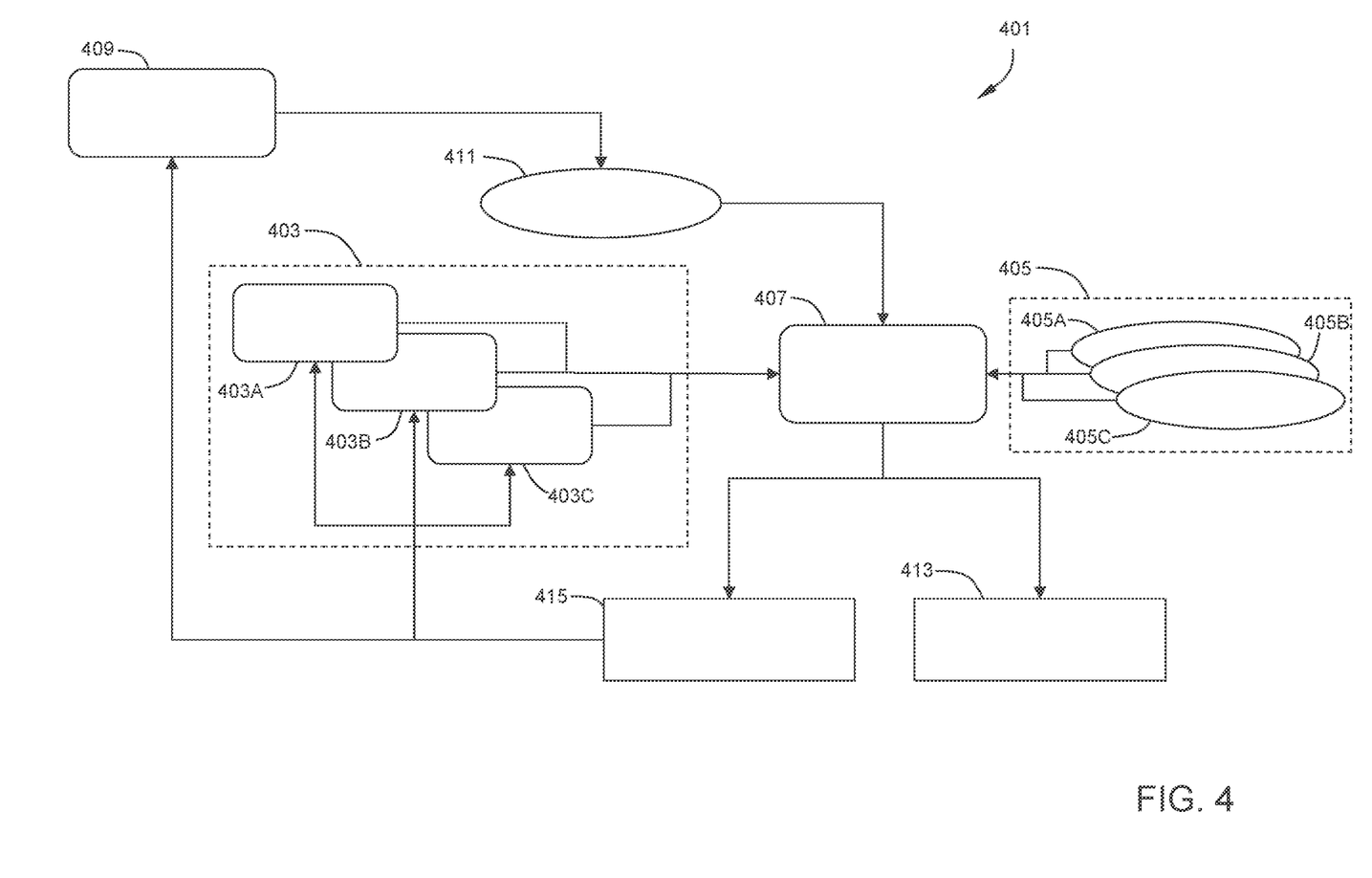
FIG. 4 illustrates an exemplary strategy and method, in accordance with the present disclosure.

FIG. 4 illustrates an exemplary strategy and method 401 in accordance with the present disclosure. In one embodiment, strategy and method 401 is implemented by controller 201. Fault detection module 403 may be implemented within microcontroller 203 of controller 201 and may include a plurality of fault detection mechanisms 403A-403C corresponding, in the present embodiment, to CAN status information from CAN controller 415 as further described herein. Fault detection module may be included as part of the basic software level 301 of the control strategy and method 300 of FIG. 3. Fault detections are monitored by recovery manager 407 which references appropriate fault remediation mechanisms 405A-405C of fault remediation module 405 for implementation in an ordered, hierarchical approach to recovery. Recovery manager 407 may be included as part of the basic software level 301 of the control strategy and method 300 of FIG. 3. Fault remediation module 405 may be included as part of the basic software level 301 of the control strategy and method 300 of FIG. 3 or alternatively as part of a data level (not illustrated). Recovery is controlled via appropriate actions or commands corresponding to the desired fault remediation mechanism (s) 405A-405C to one or more of the CAN controller 415 and the microcontroller 413. Strategy and method 401 may further include checkpoint manager 409 which maintains a running store of received and transmitted CAN message frames as checkpoints 411 from CAN controller 415. Checkpoint manager 409 may be included as part of the basic software level 301 of the control strategy and method 300 of FIG. 3. Checkpoints 411 may be utilized by the recovery manager 407 subsequent to detected faults and recovery in accordance with the appropriate fault remediation mechanism 405A-405C.

Figure 5:
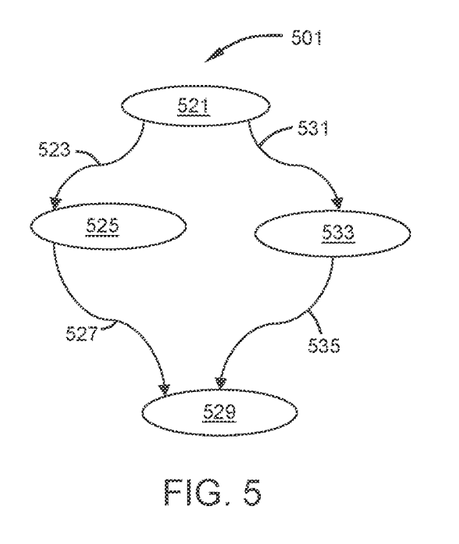
FIG. 5 illustrates an embodiment of a transmit lockup detection strategy, in accordance with the present disclosure.

In one embodiment, the plurality of detection mechanisms 403A-403C of fault detection module 403 may include detection of bus-off faults, transmit faults and receive faults. Transmit faults may be detected by a transmit lockup detector 403A. Receive faults may be detected by a receive lockup detector 403B. Bus-off faults may be detected by bus-off fault detector 403C, which detection may be accomplished by any appropriate technique including, for example, through well-known transmit and receive error counters and active error, passive error and bus-off status indicators. FIG. 5 illustrates an embodiment of a transmit lockup detection strategy 501 in accordance with the present disclosure. Transmit lockup detection strategy 501 may be invoked periodically during ongoing runtime or when a message sent fails. In one scenario, a message transmission is commanded 521 and a message sent failure 523 may be returned by the CAN controller 211. CAN controller 211 may include a software driver including resident software diagnostics configured to return one or more fault codes indicating a message sent failure 523 at the software layer of the CAN (e.g. at the CAN driver software level). After a predetermined number of unsuccessful message transmission attempts as indicated by a plurality of message sent failures 523, queries of the CAN controller 211 and transmission buffer 215 are invoked 525 for status information. A flag is set 527 and a transmit lockup is determined 529. In another scenario, a message transmission is commanded 521 and no message sent failure is returned by the CAN controller 211, however, the message is not going out on the bus for unknown reasons, for example hardware driver within transceiver 217 latching low or high, or an over temperature condition. However, through feedback, for example via bit level diagnostics (i.e. bus monitoring by the CAN controller), it is known whether the desired transmitted message was successfully transmitted at the physical layer of the CAN system (e.g. CAN bus and transceiver). Thus, after a predetermined period 531 a transmission check 533 is performed, for example a comparison of successful transmissions (transmit confirmations) to known number of requested transmissions (transmit requests) during the predetermined period. Where the count differential exceeds some predetermined threshold 535, a transmit lockup is determined 529. In such scenario, the predetermined period 531 may be calibratable as desired and the count differential predetermined threshold 535 also may be calibratable as desired.

Figure 6:
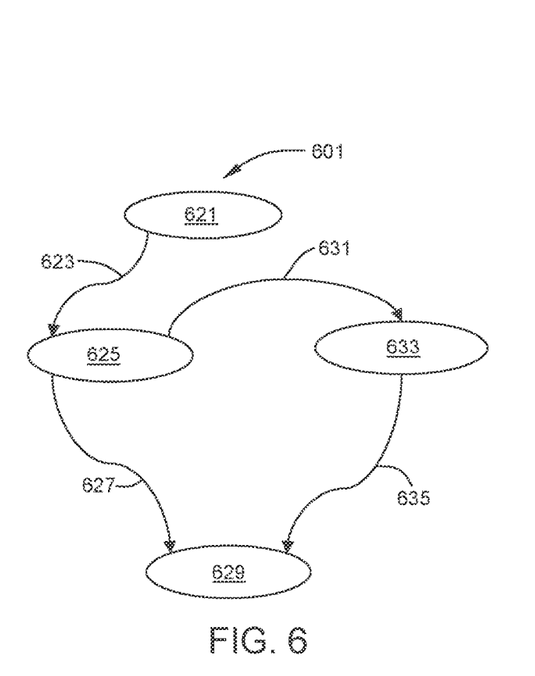
FIG. 6 illustrates an embodiment of a receive lockup detection strategy, in accordance with the present disclosure.

FIG. 6 illustrates an embodiment of a receive lockup detection strategy 601 in accordance with the present disclosure. Receive lockup detection strategy 601 may be invoked periodically during ongoing runtime, for example anytime the controller is settled into a normal or steady-state of operation subsequent to successful start-up services and operating system loading or equivalent boot-up processes. In one scenario, the controller is ready to receive CAN message frames 621 but subsequent to a periodic timeout duration 623 no CAN message frame is received. The periodic timeout duration 623 may be calibratable as desired. After such no message received period, queries of the CAN controller 211 and receive buffer 213 are invoked 625 for status information. A flag is set 627 and a receive lockup is determined 629. In another scenario, the receive buffer 213 may be full and the CAN controller 211 notifies runtime operating system 303 of microcontroller 203 of such condition and lockup is determined 629. Additionally, subsequent to the periodic timeout duration 631 when no CAN message frame is received, a remote check 633 may be invoked wherein checkpoints may be used to determine the last communicated node(s) and a check CAN message frame is transmitted thereto to trigger an acknowledgement CAN message. The periodic timeout duration 631 may be calibratable as desired. Failure to receive an acknowledgement CAN message frame 635 determines a receive lockup 629.

In accordance with the present disclosure, fault remediation mechanisms 405A-405C of fault remediation module 405 may include a buffer clean-up and software flag reset 405A, CAN controller reset 405B and microcontroller running reset 405C. Fault remediation module 405 is utilized to implement a hierarchical recovery strategy based upon the detected fault. Thus, as dictated by the detected fault, remediation attempts occur in ordered fashion from the least intrusive or disruptive hardware and software levels through to the most intrusive or disruptive hardware and software levels. In one embodiment, buffer clean-up and software flag reset 405A provides the least intrusive remediation strategy. Buffer clean-up and software flag reset 405A may include software level processes wherein no running tasks or system states are affected beyond message buffers and associated flags. Buffer clean-up and software flag reset 405A may be invoked by the recovery manager 307 through CAN buffer and flag reset process 323 of CAN driver software level 321 as described herein in connection with FIG. 3. For example, upon detection of transmit or receive lockup, and in the absence of a bus-off fault, buffer clean-up and software flag reset 405A may be invoked to, for example, flush stored messages within one or both of the transmit and receive buffers 215, 213 as appropriately indicated by the detected fault(s). This may include, for example, counter resetting, initialization of all message storage locations, pointer adjustments for subsequent messages, and combinations of such remedial actions. Moreover, buffer clean-up and software flag reset 405A may be invoked to reset software flags to indicate message buffer availability and to recover at least one prior CAN message frame from the checkpoints as described herein. During buffer clean-up and software flag reset 405A, buffers are exclusively accessible to the fault remediation process to prevent CAN bus message overwriting. In one embodiment, CAN controller reset 405B provides an intermediately intrusive remediation strategy. CAN controller reset 405B may include the buffer clean-up and software flag reset 405A remediation as described herein, and additionally may include a reset of the CAN controller 211 invoked by the recovery manager 307 through CAN controller reset process 325 of CAN driver software level 321 as described herein in connection with FIG. 3. For example, upon detection of a bus-off fault or a CAN controller fault, such as may be indicated by a fault codes indicating a message sent failure as described with respect to FIG. 5 or failure to receive an acknowledgement CAN message frame upon a transmitted check CAN message frame as described with respect to FIG. 6, buffer clean-up and software flag reset 405A may be invoked to effect the associated remedial actions described herein. Moreover, CAN controller reset 405B may be invoked to reset CAN controller buffers initiate start-up services and operating system loading or equivalent boot-up processes of CAN controller 211, and to reset or initialize transceiver 217. In one embodiment, microcontroller running reset 405C provides a most intrusive remediation strategy. Microcontroller running reset 405C may include the buffer clean-up and software flag reset 405A and CAN controller reset 405B remediations as described herein, and additionally may include a reset of the microcontroller 203 invoked by the recovery manager 307 through microcontroller reset process 327 of CAN driver software level 321 as described herein in connection with FIG. 3. For example, upon detection of transmit or receive lockup, a bus-off fault, a CAN controller fault, or any fault wherein lesser intrusive remediation processes have failed to clear the fault, buffer clean-up and software flag reset 405A and CAN controller reset 405B may be invoked to effect the associated remedial actions described herein. Moreover, microcontroller running reset 405C may be invoked to reset microcontroller buffers and runtime processes by initiating start-up services and operating system loading or equivalent boot-up processes of microcontroller 203. Preferably, microcontroller running resets 405C are limited in availability due to the intrusive nature of such remediation. For example, a predetermined number of such microcontroller running resets 405C, in total or across a predetermined temporal basis, may be allowed before the controller invokes a mode of limited functionality pending system service. This may include, for example, a so-called limp home mode of vehicle operation in an automotive application.

Figure 7:
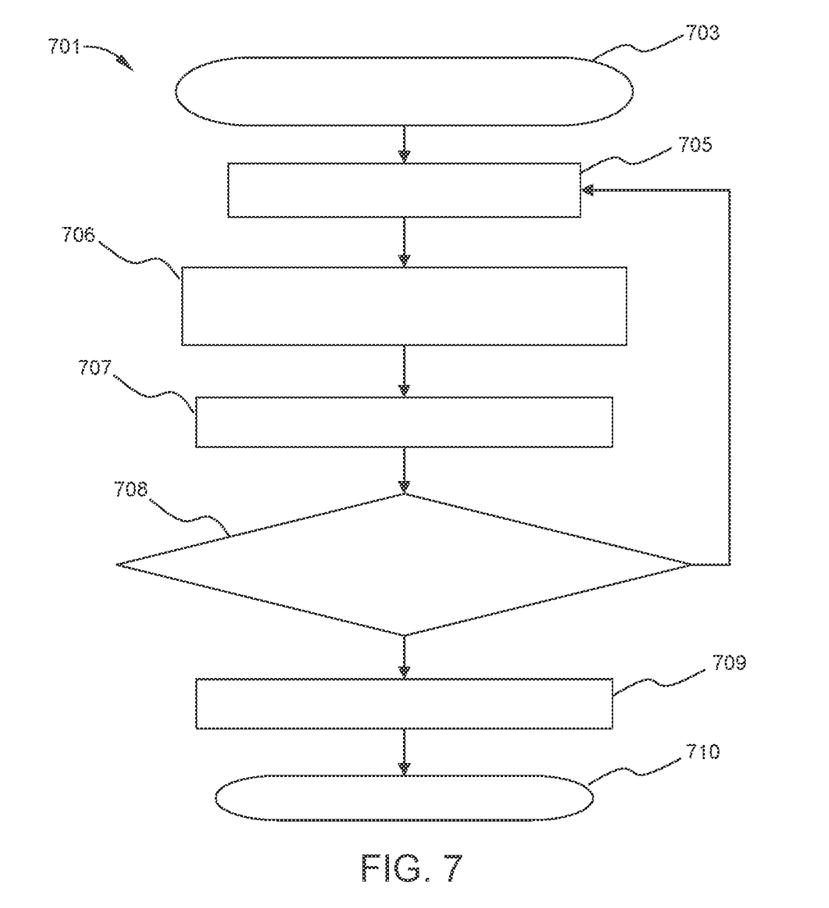
FIG. 7 illustrates an exemplary fault detection and recovery process, in accordance with the present disclosure.

FIG. 7 illustrates a fault detection and recovery process 701 which may be implemented as running code within a controller in accordance with the present disclosure. Fault detection 703 monitors during runtime for faults via fault detection module 403, including, by way of example, bus-off, transmit lockup, and receive lock-up as described herein. Faults are categorized 705, for example to determine modes of failure (e.g., transmission fault code or transmission request vs. confirmation count differential). Based upon the categorizations, an appropriate least intrusive recovery strategy is determined 706. Appropriate commands are sent to the appropriate hardware and software components to invoke the desired recovery strategy 707. A determination is made whether the same or additional faults are present subsequent to invocation of the current desired recovery strategy 708. Where none exist, fault indicators such as flags or set codes are cleared 709 and the process exits 710. Where continuing faults exist, the process repeats from 705 whereat current faults are categorized and subsequent recovery processes are once again run.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A controller area network (CAN) fault detection and recovery system, comprising:
   a CAN node comprising a controller including a microcontroller, a CAN controller and a transceiver for transmitting and receiving CAN message frames;
   the controller comprising:
   a fault detection module comprising a plurality of fault detection mechanisms for detecting CAN faults;
   a fault remediation module comprising a plurality of fault remediation mechanisms for remediating detected CAN faults, wherein the plurality of fault remediation mechanisms comprises a buffer clean-up and software flag reset, a CAN controller reset, and a microcontroller running reset; and
   a recovery manager configured to select one or more of the fault remediation mechanisms based upon detected CAN faults, and to control remediation of detected CAN faults in accordance with the selected fault remediation mechanisms in a predetermined ordered hierarchy.

2. The system of claim 1, wherein the controller further comprises a checkpoint manager for maintaining a running store of CAN message frames.

3. The system of claim 1, wherein the fault detection module, the fault remediation module and the recovery manager comprise a basic software level.

4. The system of claim 1, wherein remediation of detected CAN faults is carried out at a CAN driver software level.

5. The system of claim 1, wherein the predetermined ordered hierarchy comprises, in order, the buffer clean-up and software flag reset, the CAN controller reset, and the microcontroller running reset.

6. The system of claim 1, wherein the predetermined ordered hierarchy comprises least to most intrusive fault remediation mechanisms.

7. A controller area network (CAN) fault detection and recovery system, comprising:
a CAN node comprising a controller including a microcontroller, a CAN controller and a transceiver for transmitting and receiving CAN message frames;
the controller comprising:
a fault detection module comprising a plurality of fault detection mechanisms for detecting CAN faults, wherein the plurality of fault detection mechanisms for detecting CAN faults comprises a transmit lockup detector, a receive lockup detector, and a bus-off fault detector;
a fault remediation module comprising a plurality of fault remediation mechanisms for remediating detected CAN faults; and
a recovery manager configured to select one or more of the fault remediation mechanisms based upon detected CAN faults, and to control remediation of detected CAN faults in accordance with the selected fault remediation mechanisms in a predetermined ordered hierarchy.

8. The system of claim 7, wherein the transmit lockup detector comprises a CAN driver software level diagnostic and a physical layer diagnostic.

9. The system of claim 7, wherein the receive lockup detector detects a predetermined period wherein no CAN message is received or detects a full receive buffer.

10. The system of claim 9, wherein the receive lockup detector further comprises, subsequent to the predetermined period wherein no CAN message is received, invocation of a remote check.

11. The system of claim 7, wherein the predetermined ordered hierarchy comprises least to most intrusive fault remediation mechanisms.

12. A method for controller area network (CAN) fault detection and recovery, comprising:
detecting, with a fault detection module comprising a plurality of fault detection mechanisms, CAN faults;
selecting, with a recovery manager, fault remediation mechanisms from a fault remediation module based upon the detected CAN faults, wherein the fault remediation mechanisms comprise a buffer clean-up and software flag reset, a CAN controller reset, and a microcontroller running reset; and
controlling remediation of detected CAN faults in accordance with the selected fault remediation mechanisms in a predetermined ordered hierarchy.

13. The method of claim 12, wherein the predetermined ordered hierarchy comprises, in order, the buffer clean-up and software flag reset, the CAN controller reset, and the microcontroller running reset.

14. The method of claim 12, wherein the predetermined ordered hierarchy comprises least to most intrusive fault remediation mechanisms.

15. A method for controller area network (CAN) fault detection and recovery, comprising:
detecting, with a fault detection module comprising a plurality of fault detection mechanisms, wherein the plurality of fault detection mechanisms comprises transmit lockup detection, receive lockup detection, and a bus-off fault detection, CAN faults;
selecting, with a recovery manager, fault remediation mechanisms from a fault remediation module based upon the detected CAN faults; and
controlling remediation of detected CAN faults in accordance with the selected fault remediation mechanisms in a predetermined ordered hierarchy.

16. The method of claim 15, wherein transmit lockup detection comprises a CAN driver software level diagnosis and a physical layer diagnosis.

17. The method of claim 15, wherein the receive lockup detection comprises detection of a predetermined period wherein no CAN message is received or detection of a full receive buffer.

18. The method of claim 17, wherein the receive lockup detection further comprises, subsequent to the predetermined period wherein no CAN message is received, invoking a remote check.

19. The method of claim 15, wherein the predetermined ordered hierarchy comprises least to most intrusive fault remediation mechanisms.

20. A controller area network (CAN) fault detection and recovery system, comprising:
a CAN node comprising a controller including a microcontroller, a CAN controller and a transceiver for transmitting and receiving CAN message frames;
the controller comprising:
a fault detection module comprising a plurality of fault detection mechanisms for detecting CAN faults, the fault detection mechanisms comprising a transmit lockup detector, a receive lockup detector, and a bus-off fault detector;
a fault remediation module comprising a plurality of fault remediation mechanisms for remediating detected CAN faults, the fault remediation mechanisms comprising a buffer clean-up and software flag reset, a CAN controller reset, and a microcontroller running reset;
a checkpoint manager for maintaining a running store of CAN message frames; and
a recovery manager configured to select one or more of the fault remediation mechanisms based upon detected CAN faults, and to control remediation of detected CAN faults at a CAN driver software level in accordance with the selected fault remediation mechanisms in a predetermined ordered hierarchy.

* * * * *